United States Patent
Shea (10) Patent No.: US 6,724,604 B2
(45) Date of Patent: Apr. 20, 2004

(54) SHORTING SWITCH AND SYSTEM TO ELIMINATE ARCING FAULTS IN POWER DISTRIBUTION EQUIPMENT

(75) Inventor: John J. Shea, Pittsburgh, PA (US)

(73) Assignee: Eaton Corporation, Cleveland, OH (US)

(*) Notice: Subject to any disclaimer, the term of this patent is extended or adjusted under 35 U.S.C. 154(b) by 119 days.

(21) Appl. No.: 10/172,208

(22) Filed: Jun. 14, 2002

(65) Prior Publication Data

US 2003/0231453 A1 Dec. 18, 2003

(51) Int. Cl.$^7$ ................................................. H02H 3/00
(52) U.S. Cl. .......................... 361/118; 361/42; 361/62; 361/115
(58) Field of Search .............................. 361/42, 44, 45, 361/58, 115, 2, 10, 14, 62, 64, 66, 118

(56) References Cited

U.S. PATENT DOCUMENTS

| | | | |
|---|---|---|---|
| 5,510,946 A | 4/1996 | Franklin | 361/56 |
| 5,903,427 A | 5/1999 | Roby | 361/128 |
| 5,933,308 A | 8/1999 | Garzon | 361/62 |
| 5,940,547 A | 8/1999 | Schumacher et al. | 385/12 |
| 6,084,756 A * | 7/2000 | Doring et al. | 361/45 |
| 6,140,715 A | 10/2000 | Bernhoff et al. | 307/117 |
| 6,141,192 A | 10/2000 | Garzon | 361/5 |
| 6,229,680 B1 | 5/2001 | Shea | 361/92 |
| 6,239,514 B1 | 5/2001 | Isberg et al. | 307/116 |
| 6,506,990 B2 * | 1/2003 | Marin-Pache et al. | 200/400 |
| 6,657,150 B1 * | 12/2003 | Shea et al. | 218/154 |

OTHER PUBLICATIONS

Klockner–Moeller Ltd., "Arcon, Arc Fault Detection and Quenching System", 6 pgs.

Utu, "UTU Arc Protection Systems—a possibility to be protected", 4 pgs., Ulvila, Finland.

Garzon, R., "Arc Terminator An Alternative to Arc–Proofing", pp. 1–5, Square "D" Company, Smyrna, TN.

Square D Schneider Electric, "Arc–Terminator—Medium voltage arc–detection and arc–termination device", Power 2000, 9 pgs.

ABB Power Distribution, "ArcEliminator Rapid Elimination of Internal Arcing", 4 pgs., Arboga, Sweden.

Siemens, "Pressure Switch System 8A×10 For Medium Voltage Switchgear", 1 pg.

Berger, F. et al., "KurzschlieBer mit Gasgeneratorantrieb fur Storlichtbogenschutz", 4 pgs., Mar. 1999, Federal Republic of Germany.

Risi, "EBW Cable Cutter", 1 pg., San Ramon, CA.

Risi, "Technical Discussion on Explosives", 13 pgs.

* cited by examiner

Primary Examiner—Stephen W. Jackson
(74) Attorney, Agent, or Firm—Martin J. Moran (57) ABSTRACT

A shorting switch eliminates arcing faults in power distribution equipment. The shorting switch includes a magnetic core having a pin member and an opening. A conductor is electrically connected between the first and second terminals and passes through the opening of the magnetic core. A switch member is pivotally mounted to the pin member of the magnetic core and is adapted to pivot toward and engage the conductor in response to arcing fault current flowing through the conductor. A third terminal is electrically interconnected with the switch member. A latch member has a first position, which holds the switch member apart from the conductor, and a second position, which releases the switch member to permit the switch member to pivot toward the magnetic core and engage the conductor in response to the arcing fault current. A solenoid unlatches the latch member in response to an activation signal.

24 Claims, 11 Drawing Sheets

FIG.13C

SHORTING SWITCH AND SYSTEM TO ELIMINATE ARCING FAULTS IN POWER DISTRIBUTION EQUIPMENT

CROSS-REFERENCE TO RELATED APPLICATIONS

This application is related to commonly assigned, concurrently filed:

U.S. patent application Ser. No. 10/172,651, filed Jun. 14, 2002, entitled "Shorting Switch And System To Eliminate Arcing Faults In Power Distribution Equipment", now U.S. Pat. No. 6,657,150.

BACKGROUND OF THE INVENTION

1. Field of the Invention

The invention is directed to shorting switches and, in particular, to shorting switches for eliminating arcing faults in power distribution equipment. The invention is also directed to shorting systems for eliminating arcing faults in power distribution equipment.

2. Background Information

There is the potential for an arcing fault to occur across the power bus of a motor control center (MCC), another low voltage (LV) or medium voltage (MV) enclosure (e.g., a LV or MV circuit breaker panel) and other industrial enclosures containing LV or MV power distribution components. This is especially true when maintenance is performed on or about live power circuits. Frequently, a worker inadvertently shorts out the power bus, thereby creating an arcing fault inside the enclosure. The resulting arc blast creates an extreme hazard and could cause injury or even death. This problem is exacerbated by the fact that the enclosure doors are typically open for maintenance.

A high-speed shorting switch is needed for low and medium voltages as an alternative to arc proofing switchgear enclosures. Presently, manufacturers are developing more robust enclosures, which contain and direct the hot gases and flames out the top of the enclosure upon the occurrence of an internal arcing fault (e.g., a short across the bus bar, breaker, cable phase-to-phase or phase-to-ground). These faults can occur from a wide variety of sources, such as, for example, animals that crawl into the enclosure, tools left behind from maintenance crews, insulation failure, earthquakes, and other mechanical damage.

Rather than trying to contain and direct the blast, a new idea has been developed by others for eliminating the arcing fault altogether. This is done by shorting out the power bus either phase-to-phase or phase-to-ground. Known shorting switches use a variety of closing and holding techniques which are very expensive to buy and to maintain. Such switches are located on the main power bus to shut down the entire power bus system when a fault occurs even if the fault is only on the load side of a branch circuit.

It is known to employ various types of crowbar switches for this purpose. The switches short the line voltage on the power bus, eliminating the arc and preventing damage. The resulting short on the power bus causes an upstream circuit breaker to clear the fault.

Examples of medium voltage devices include a stored energy mechanism with vacuum interrupter contacts, and a mechanism to crush a conductor magnetically.

An example of a low voltage device is a stored energy air bag actuator, which drives a conductive member having a pin and a flange, in order to short two contacts. The first contact is in the form of a receptor for capturing the pin of the driven conductive member. The second contact has an opening, which allows the pin to pass therethrough, but which captures the flange of the driven member.

There is room for improvement in shorting switches and systems that respond to arcing faults and switch fast enough in order to protect workers and equipment from arc blasts associated with power distribution equipment.

SUMMARY OF THE INVENTION

These needs and others are met by the present invention, which provides a magnetically actuated high-speed shorting switch suitable for low or medium voltage switchgear applications.

As one aspect of the invention, a shorting switch for eliminating arcing faults in power distribution equipment comprises: a magnetic core having a pin member and an opening; a first terminal; a second terminal; a conductor electrically connected between the first and second terminals, the conductor passing through the opening of the magnetic core; a switch member pivotally mounted to the pin member of the magnetic core and adapted to pivot toward and engage the conductor in response to arcing fault current flowing through the conductor; a third terminal, which is electrically interconnected with the switch member; a latch member having a first position, which holds the switch member apart from the conductor, and a second position, which releases the switch member to permit the switch member to pivot toward the magnetic core and engage the conductor in response to the arcing fault current; and means for unlatching the latch member in response to an activation signal.

The latch member may have a first end, which engages the switch member, a pivot point, and a second end. The means for unlatching the latch member in response to an activation signal may include a solenoid having a plunger, which moves the second end of the latch member to pivot the latch member about the pivot point and cause the first end of the latch member to release the switch member.

The magnetic core may have a surface, and the switch member may be adapted to pivot toward the surface of the magnetic core. The switch member surface may be normally disposed at an arcuate angle with respect to the surface of the magnetic core.

As another aspect of the invention, a shorting switch for eliminating arcing faults in power distribution equipment comprises: a magnetic core having a pin member and an opening; a first terminal; a second terminal; a conductor electrically connected between the first and second terminals, the conductor passing through the opening of the magnetic core; a switch member pivotally mounted to the pin member of the magnetic core and adapted to pivot toward and engage the conductor in response to arcing fault current flowing through the conductor; a third terminal, which is electrically interconnected with the switch member; a latch member having a first position, which holds the switch member apart from the conductor, and a second position, which releases the switch member to permit the switch member to pivot toward the magnetic core and engage the conductor in response to the arcing fault current; a vacuum bottle, with the conductor, the magnetic core, the pin member, and the switch member being disposed within the vacuum bottle; and means for unlatching the latch member in response to an activation signal.

The first, second and third terminals may be disposed outside the vacuum bottle. The switch member may have a first end disposed within the vacuum bottle and a second end disposed outside the vacuum bottle. The first and second terminals may be adapted for operation with medium voltage power distribution equipment.

As another aspect of the invention, a shorting system for eliminating arcing faults in power distribution equipment comprises: a magnetic core having a pin member and an opening; a first terminal; a second terminal; a conductor electrically connected between the first and second terminals, the conductor passing through the opening of the magnetic core; a switch member pivotally mounted to the pin member of the magnetic core and adapted to pivot toward and engage the conductor in response to arcing fault current flowing through the conductor; a third terminal, which is electrically interconnected with the switch member; a latch member having a first position, which holds the switch member apart from the conductor, and a second position, which releases the switch member to permit the switch member to pivot toward the magnetic core and engage the conductor in response to the arcing fault current; means for unlatching the latch member in response to an activation signal; and means for detecting an arcing fault and responsively outputting the activation signal.

The second terminal may be adapted for electrical connection upstream of a plurality of circuit breakers. The first terminal may be structured for electrical connection with a load terminal of a single circuit breaker.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
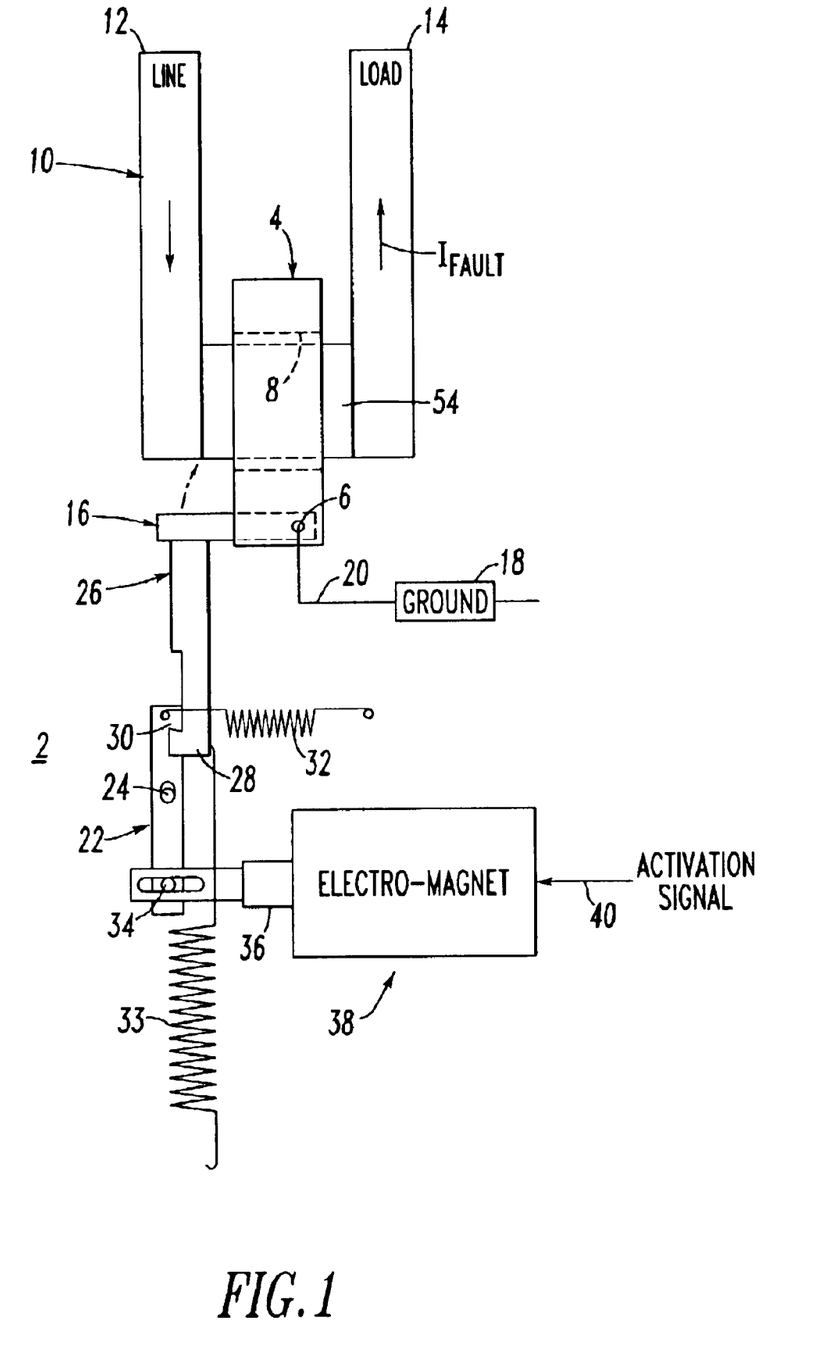
FIG. 1 is block diagram of a single phase, high-speed shorting switch in accordance with the present invention.

Referring to FIG. 1, a single phase, high-speed shorting switch 2 eliminates arcing faults in power distribution equipment (not shown). The shorting switch 2 includes a magnetic core 4 (e.g., made of steel) having a pin member 6 and an opening 8 (shown in hidden line drawing). A conductor 10 (e.g., made of copper) is electrically connected between first and second terminals 12 and 14 (e.g., LINE and LOAD, respectively) and passes through the opening 8 of the magnetic core 4. A switch member 16 (e.g., made of steel) is pivotally mounted to the magnetic core pin member 6 and is adapted to pivot toward and engage the conductor 10 in response to a sufficient magnitude of arcing fault current ($I_{FAULT}$) flowing through the conductor 10. A third terminal 18 (e.g., GROUND) is electrically interconnected (e.g., by flexible shunt 20 electrically connected to the switch member 16 and/or to the pin member 6) with the switch member 16. A latch member 22 has a first position (as shown in FIG. 1), which holds the switch member 16 apart from the conductor 10, and a second position (e.g., rotated counter-clockwise with respect to FIG. 1 about pivot point 24), which releases the switch member 16 to permit such switch member to pivot (e.g., clockwise with respect to FIG. 1 about pin member 6) toward the magnetic core 4 and engage the conductor 10 in response to the arcing fault current ($I_{FAULT}$).

Figure 2:
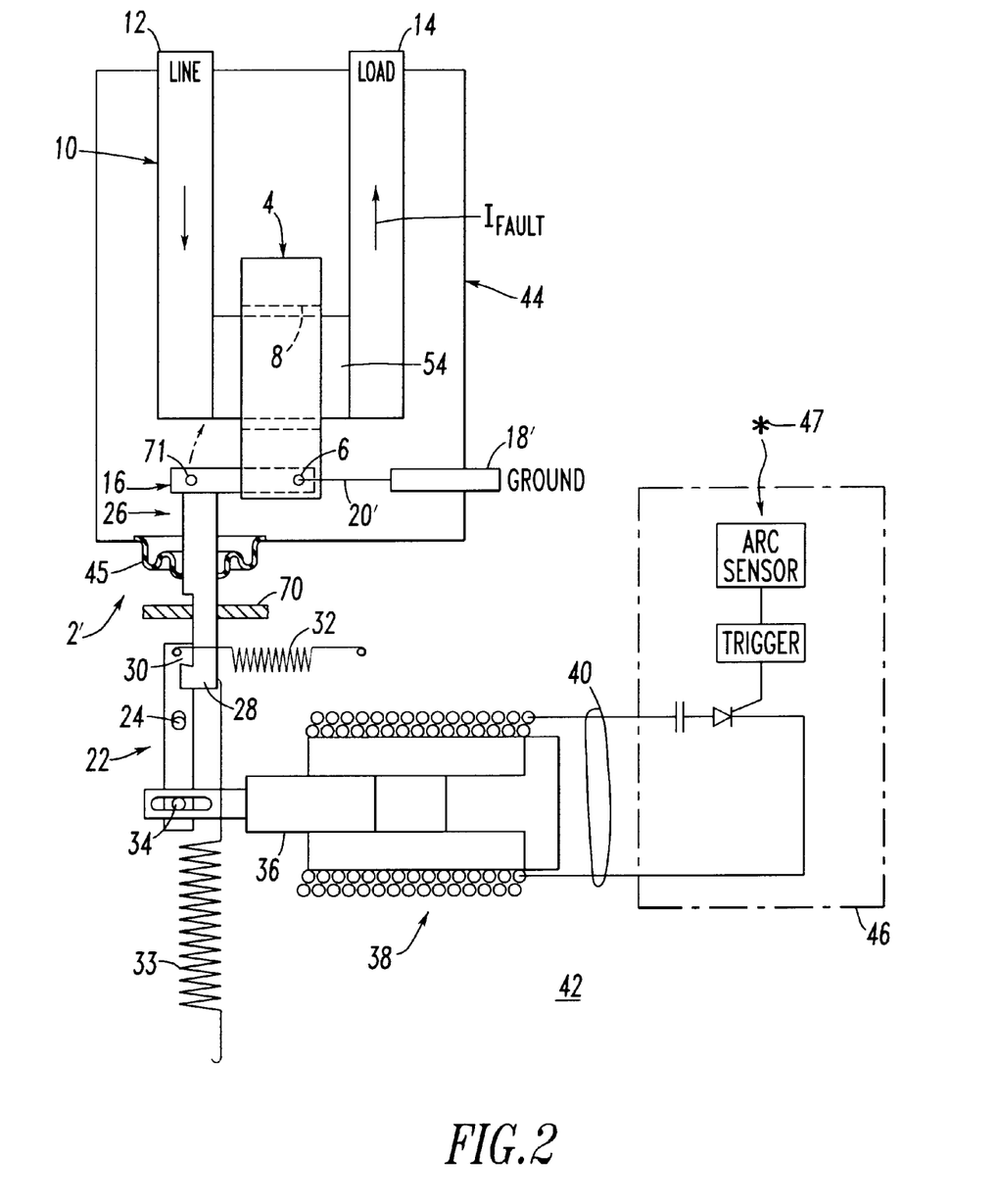
FIG. 2 is block diagram of a single phase, high-speed shorting system employing a shorting switch, a vacuum bottle, and an arcing fault detection and activation circuit in accordance with another embodiment of the invention.

In the exemplary embodiment of FIG. 1, the switch member 16 has a member 26 (e.g., pinned thereto as shown in FIG. 2). The member 26 has a lower hook 28, which normally engages a corresponding hook 30 at the upper end (with respect to FIG. 1) of the latch member 22. A latch spring 32 normally biases the latch member 22 clockwise with respect to FIG. 1 about pivot point 24. Also, a holdback spring 33 normally biases the member 26 and the switch member 16 counter-clockwise with respect to FIG. 1 about the pin member 6 and away from the conductor 10. However, after the hook 28 is released, a suitable level of arcing fault current ($I_{FAULT}$) overcomes the bias of the spring 33 and causes the switch member 16 to electrically engage the conductor 10, thereby shorting the same to the ground terminal 18.

The lower (with respect to FIG. 1) end 34 of the latch member 22 engages a movable member 36 of a suitable electromagnetic mechanism 38 (e.g., a solenoid), which movable member 36 is moved to the right of FIG. 1, in order to unlatch the latch member 22 in response to an activation signal 40. For example, the movable member 36 may be a solenoid plunger, which moves the end 34 of the latch member 22 to pivot the same about pivot point 24 and cause the latch member hook 30 to release the switch member hook 28.

FIG. 2 shows a shorting system 42 including a shorting switch 2', which is similar to the shorting switch 2 of FIG. 1. Unlike the shorting switch 2, the shorting switch 2' includes a vacuum bottle 44, with the conductor 10, the magnetic core 4, the pin member 6 and the switch member 16 being disposed within such vacuum bottle 44. In this embodiment, a third terminal 18' (e.g., GROUND) is electrically connected (e.g., by conductor 20') with the pin member 6. In turn, the pin member 6 electrically engages the switch member 16 and the magnetic core 4. The shorting system 42 also includes the solenoid 38 for unlatching the latch member 22 in response to the activation signal 40, and a detection circuit 46 for detecting an arcing fault 47 and responsively outputting the activation signal 40.

Preferably, as shown in FIG. 2, the three terminals 12,14, 18' are disposed outside the vacuum bottle 44 for ease of access and are adapted for operation with medium voltage power distribution equipment (not shown). For example, the first and second terminals 12,14 may be electrically connected in series with a medium voltage power line (not shown) (e.g., downstream of a medium voltage circuit breaker; upstream of a plurality of medium voltage circuit breakers). Although a GROUND terminal 18' is shown, such terminal may be electrically connected to a neutral or to a second different power line. The member 26 of the switch member 16 has its upper (with respect to FIG. 2) end disposed within the vacuum bottle 44 and it lower end at the hook 28 disposed outside such vacuum bottle. The bellows 45 allow movement of the member 26 while maintaining a suitably high vacuum seal.

Figure 3:
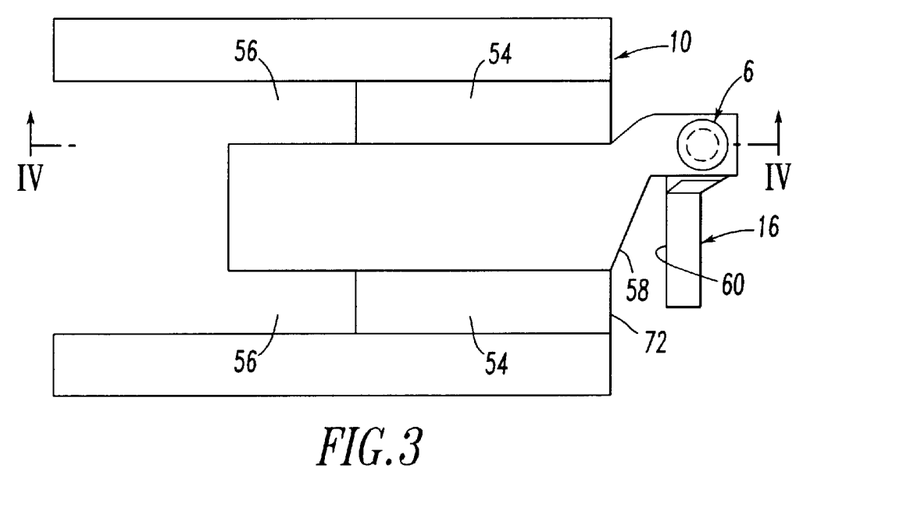
FIG. 3 is a side elevation view of the closing switch portion of the shorting switch of FIG. 2.
Figure 4:
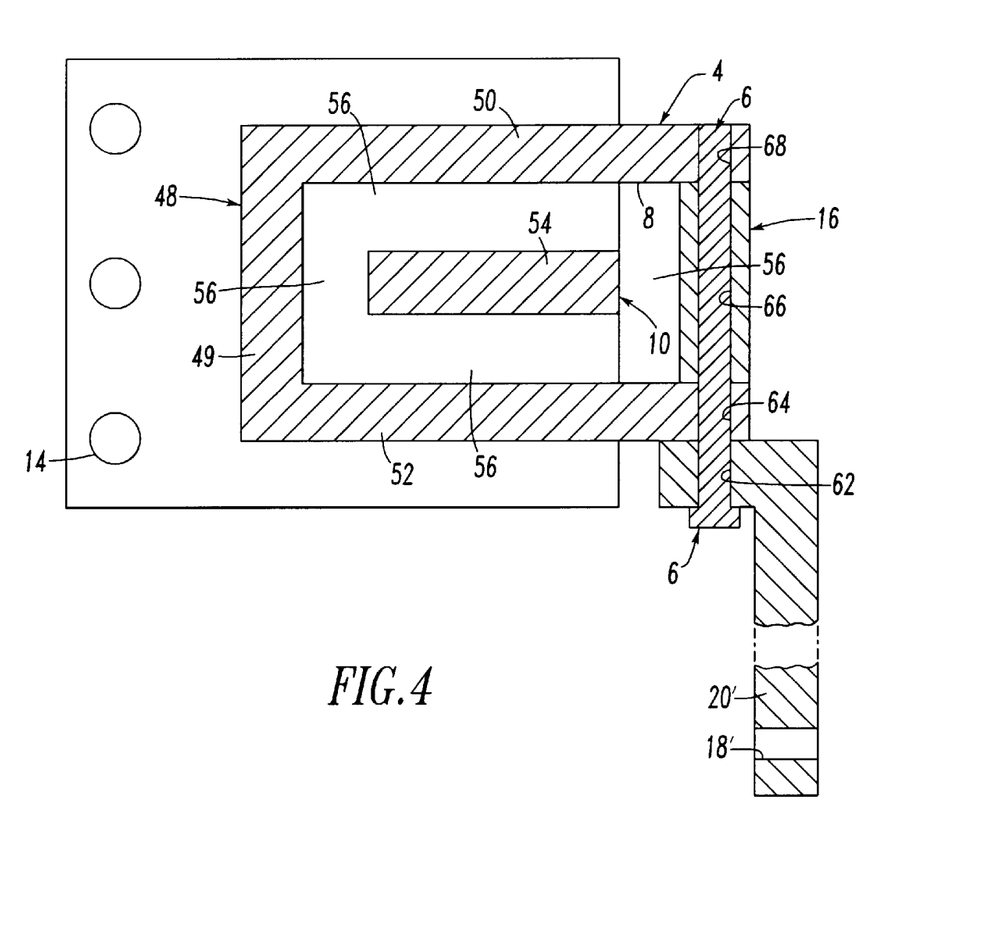
FIG. 4 is a cross-sectional view along lines IV—IV of FIG. 3.

Referring to FIGS. 3 and 4, the magnetic core 4, the pin member 6, the magnetic core opening 8, the conductor 10, the second terminal 14 (FIG. 4) and the third terminal 18' are shown, it being understood that the first terminal 12 may have a similar structure as the second terminal 14. As best shown in FIG. 4, the magnetic core 4 includes a U-shaped core portion 48 having a base 49 and a pair of legs 50,52. The pin member 6 of the magnetic core 4 is pinned between those legs 50,52. The magnetic core 4 is electrically insulated from the conductor 10, which has a conductive portion 54 that passes through the opening 8 of the magnetic core 4, with a suitable air gap 56 separating the conductor 10 from the magnetic core 4 at about the opening 8. As best shown in FIG. 3, the magnetic core 4 has a surface 58 and the switch member 16 is adapted to pivot on the pin member 6 toward such magnetic core surface. The switch member 16 has a surface 60, which is normally disposed at an arcuate angle (e.g., without limitation, about 23°) with respect to the magnetic core surface 58.

Referring to FIG. 4, the conductor 20' is preferably a copper bus, which is intimately electrically joined (e.g., brazed, welded) with the pin member 6. The pin member 6 passes through corresponding openings 62,64,66,68 of the conductor 20', the leg 52, the switch member 16 and the leg 50, respectively. The terminal 18' is formed as an opening in the conductor 20', although any suitable terminal structure may be employed.

Magnetic flux flows around any current carrying conductor and, preferably, flows in steel. Hence, the exemplary steel shape of the steel core 4, the steel pin 6 and the steel switch member 16 concentrates and channels the magnetic flux to flow through the exemplary steel path. Although the magnetic flux preferably flows in the steel, it also crosses any gaps in such steel, such as between the surfaces 58,60 of FIG. 3. When the magnetic flux crosses a gap in its path, a force is generated toward closing that gap. Hence, the forces caused by the arcing fault current ($I_{FAULT}$) flowing in the conductor 10, thereby causes the switch member surface 60 to move toward the core surface 58. As a result, this shorts the conductor 10 to the ground terminal 18'.

Figure 5:
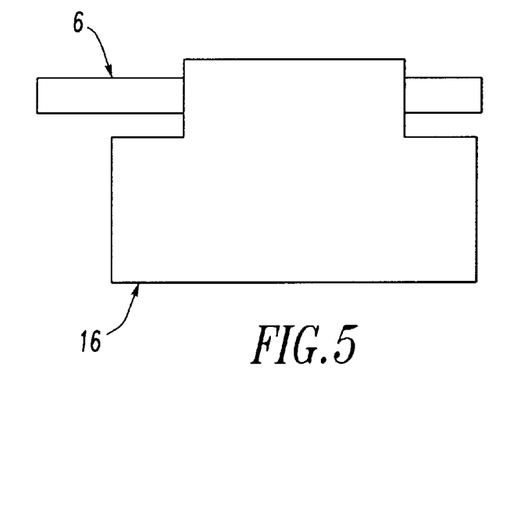
FIG. 5 is a front elevation view of the steel switch member and steel pin member of the shorting switch of FIG. 2.
Figure 6:
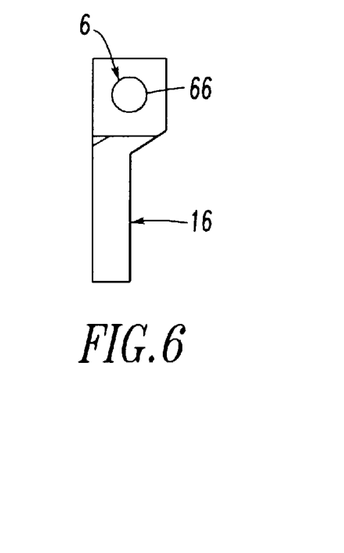
FIG. 6 is a side elevation view of the steel switch member and steel pin member of the shorting switch of FIG. 2.

FIGS. 5 and 6 show the switch member 16 and the steel pin member 6. The opening 66 of the switch member 16 is preferably large enough to permit the switch member 16 to freely pivot on the pin member 6. Whenever the surface 60 of the switch member 16 electrically engages the conductor 10 (e.g., at about 72 of FIG. 3), the voltage (e.g., a low voltage phase, a medium voltage phase) of that conductor 10 and of the terminals 12,14 is electrically connected through the switch member 16 to the pin member 6 and, thus, to the conductor 20' and to the terminal 18' (e.g., GROUND, a different low voltage phase, a different medium voltage phase). The pin member 6 and the switch member 16 act as a sliding contact. Current flows through this sliding interface, which may weld. Preferably, an upstream circuit breaker (e.g., 125 or 126 of FIG. 9) is employed to clear the resulting fault, thereby preventing the fusing of the switch member 16 and the conductor 10 (e.g., at about 72 of FIG. 3) and/or the fusing of the switch member 16 and the pin member 6 at about the opening 66.

Figure 7:
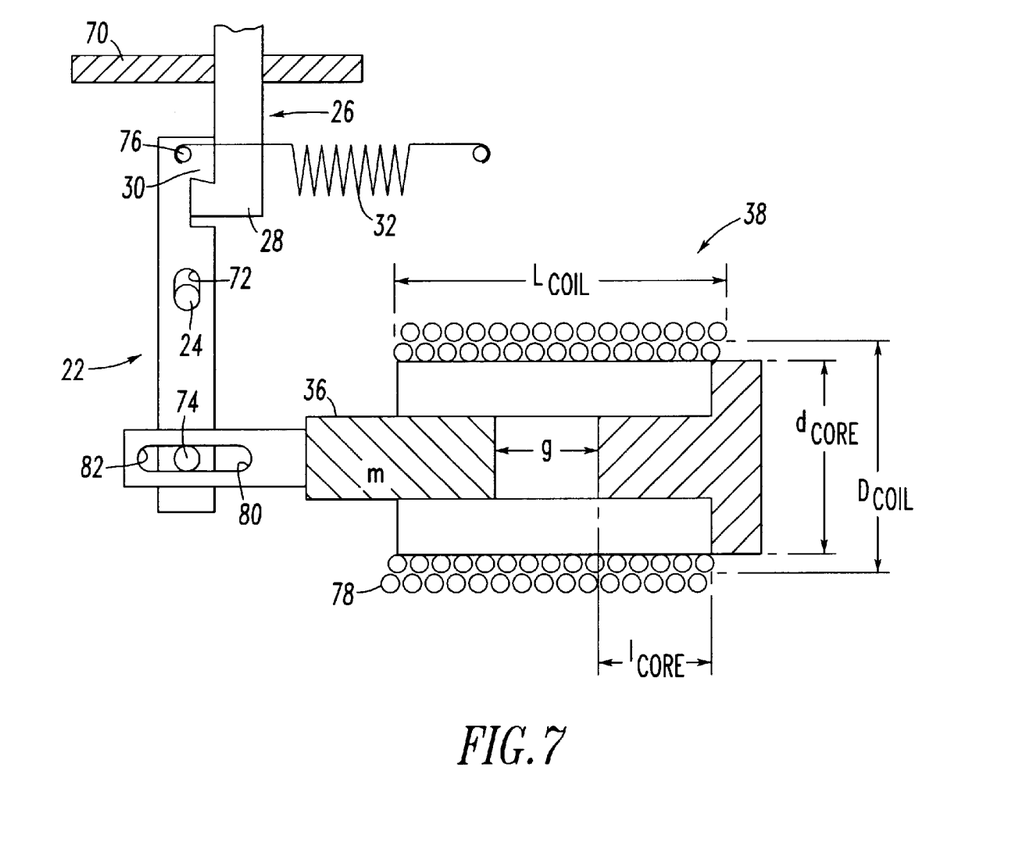
FIG. 7 is a block diagram of the latch member and solenoid of the shorting system of FIG. 2.

FIG. 7 shows the latch member 22 and the solenoid 38 of FIG. 2. A suitable mount 70 may be employed to slide the member 26 for linear movement along a path substantially parallel to the normal position of the latch member 22. In this instance, the member 26 is pivotally mounted to the switch member 16 by a pin 71 as shown in FIG. 2, although in other embodiments the member 26 may be secured to the member 16. The latch member 22 includes a central opening 72 and a lower pin 74. The spring 32 (e.g., about three pounds) is connected between an upper pin 76 of the latch member 22 and the housing (not shown) in order to bias the latch member 22 clockwise with respect to FIG. 7 and, thereby, suitably engage the corresponding hooks 28,30. The solenoid 38 has the normally extended plunger 36 and a coil 78. Whenever the solenoid 38 is activated by the activation signal 40 of FIG. 2, which energizes the solenoid coil 78, such solenoid retracts the plunger 36 (e.g., toward the right of FIG. 7).

The plunger 78 has an opening 80, which captures therein the pin 74 of the latch member 22. When the plunger 36 retracts, a plunger end portion 82 engages the pin 74, which rotates the latch member 22 counter-clockwise about pivot point 24 against the bias of the spring 32. Upon suitable retraction of the plunger 36 and suitable corresponding counter-clockwise rotation of the latch member 22, the upper hook 30 unlatches the lower hook 28 of the member 26, thereby releasing the switch member 16 of FIG. 2.

Figure 8A:
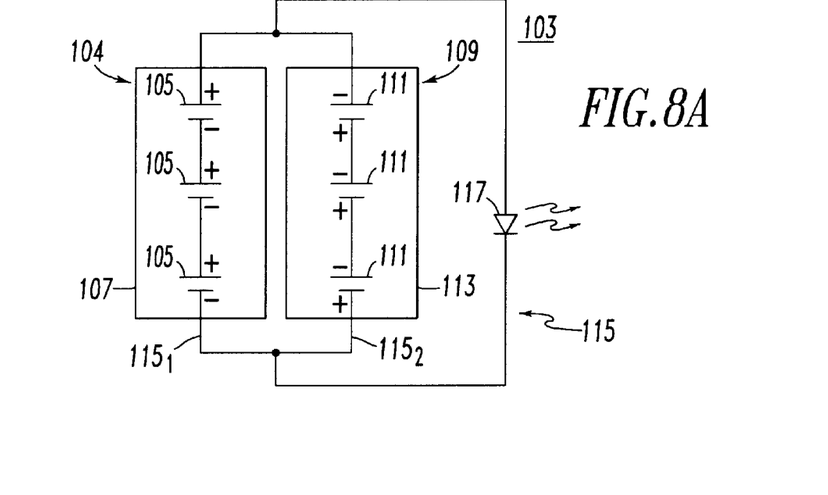
FIG. 8A is a schematic diagram of a sensor suitable for use with the arcing fault detection and activation circuit of FIG. 2.

One form of an arcing fault sensor unit suitable for use with the shorting switches 2,2' of FIGS. 1 and 2 is shown in FIG. 8A. The sensor unit 103 includes the first photovoltaic device 104 including at least one, or a plurality of series connected photovoltaic cells 105, and a first filter 107 which filters light incident upon the photovoltaic cells 105. This first filter 107 has a passband centered on the characteristic wavelength, e.g., 521.820 nm, of the arcing material.

The sensor 103 includes a second photovoltaic device 109, which also includes one or more series connected photovoltaic cells 111, and a second filter 113 which filters light incident upon the photovoltaic cells 111 and has a passband that does not include the characteristic wavelength of the arcing material, e.g., centered on about 600 nm in the exemplary system.

The first photovoltaic device 104 generates a sensed light electrical signal in response to the filtered incident light, and similarly, the second photovoltaic device 109 generates a background light electrical signal with an amplitude dependent upon the irradiance of light in the passband of the second filter 113. An electric circuit 115, having a first branch $115_1$ connecting the first photovoltaic cells 104 in series and a second branch $115_2$ similarly connecting the second photovoltaic cells 111 in series, connects these two electrical signals in opposition to a light-emitting device such as a light-emitting diode (LED) 117. When arcing is present, the sensed light electrical signal generated by the first photovoltaic device 104 exceeds the background light electrical signal generated by the second photovoltaic device 109 by a threshold amount sufficient to turn on the LED 117. While in the absence of arcing, the first photovoltaic device 104 will generate a sensed light electrical signal due to some irradiance in the passband of the first filter 107, it will be insufficient to overcome the reverse bias effect of the background light signal generated by the second photovoltaic device 109 on the LED 117. In fact, where the background light is fluorescent, from an incandescent bulb or a flashlight all of which have very low irradiance in the passband of the first filter 107, but significant irradiance in the passband of the second filter 113, the background light electrical signal will significantly exceed the sensed light electrical signal and strongly reverse bias the LED 117. The filters 107 and 113 can be interference filters, although lower cost bandpass filters could also be utilized.

Figure 8B:
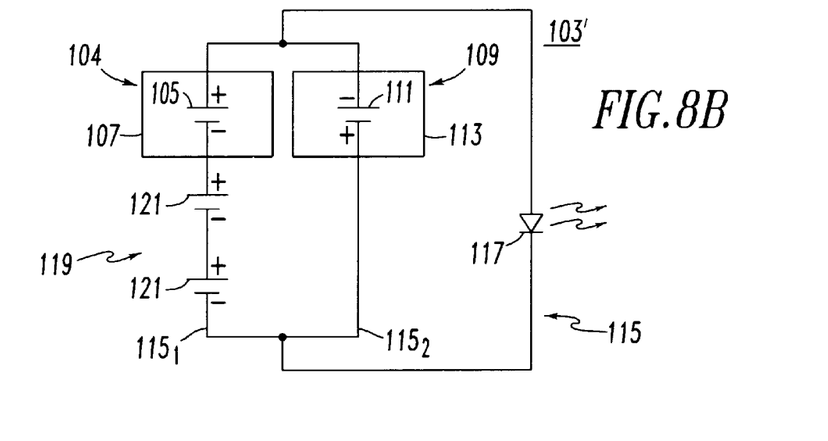
FIG. 8B is a schematic diagram of another sensor suitable for use with the arcing fault detection and activation circuit of FIG. 2.

An alternate embodiment of the sensor unit 103' shown in FIG. 8B adds a bias generator 119 in the form of one or more additional photovoltaic cells 121 connected in series with the first photovoltaic device 104 in the first branch $115_1$ of the electrical circuit 115. This puts a forward bias on the LED 117 so that fewer or smaller filtered photovoltaic cells 105 and 111 can be used. This also reduces the size and therefore the cost of the filters 107 and 113. As the additional photovoltaic cells 121 are not provided with filters, the total cost of the sensor is reduced. The embodiment of FIG. 8B can be modified as shown in FIG. 8C to place the bias generating cells 121 of the sensor 103" in series with both filtered photovoltaic cells 105 and 111, but still provide the same effect of forward biasing the LED 117.

Figure 8C:
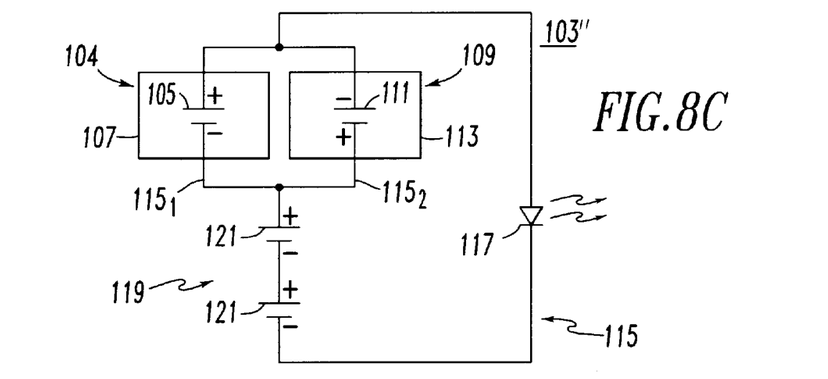
FIG. 8C is a schematic diagram of a modified form of the sensor of FIG. 8B.

Through their utilization of photovoltaic cells 105, 111 and 121, the sensors 103, 103' and 103" of FIGS. 8A–8C are self-energized.

Figure 9:
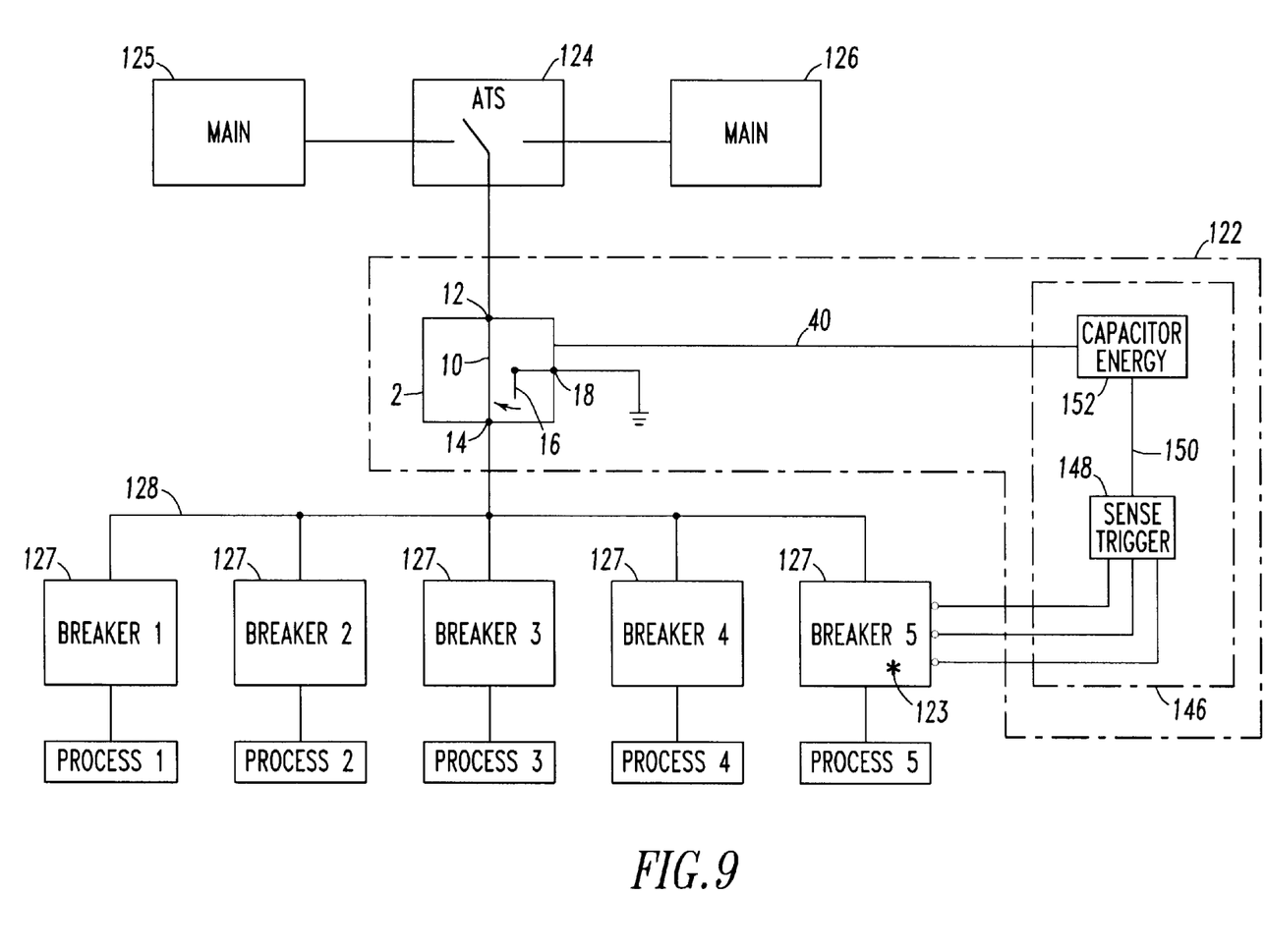
FIG. 9 is a block diagram of a shorting system in accordance with another embodiment of the invention.

FIG. 9 shows a shorting system 122, which employs the shorting switch 2 of FIG. 1 for use with arcing faults, such as 123, in power distribution equipment (e.g., switchgear). Although a single-pole shorting switch 2 is shown, a shorting switch employing a plurality of poles may be employed. Alternatively, the single-pole shorting switch 2' of FIG. 2 may be employed for medium voltage applications. The invention is applicable to any count of shorting switches 2,2' (e.g., one or more), any count of phases (e.g., one, two, three or more), and any count of shorting switches per phase (e.g., one, two, or more).

The line terminal 12 is electrically connected to an upstream automatic transfer switch 124, which is fed by two main circuit breakers 125,126, although a single upstream circuit breaker without a transfer switch may be employed. The load terminal 14 is electrically connected to a plurality of downstream branch circuit breakers 127 by a power bus 128. In response to the arcing fault 123, which is downstream of one of the circuit breakers 127 (e.g., Breaker 5), the shorting system 122 detects the arcing fault 123 and outputs the activation signal 40 to the shorting switch 2. As discussed above in connection with FIGS. 1–7, the latch member 22 (FIG. 1) releases the switch member 16, which moves toward and engages the conductor 10 in response to the arcing fault current flowing in the bus 128, and the switch member 16 shunts such arcing fault current to ground through the ground terminal 18. As a result, one of the main circuit breakers, such as 125, clears the fault and shuts down all of the branch circuit breakers 127.

Figure 10:
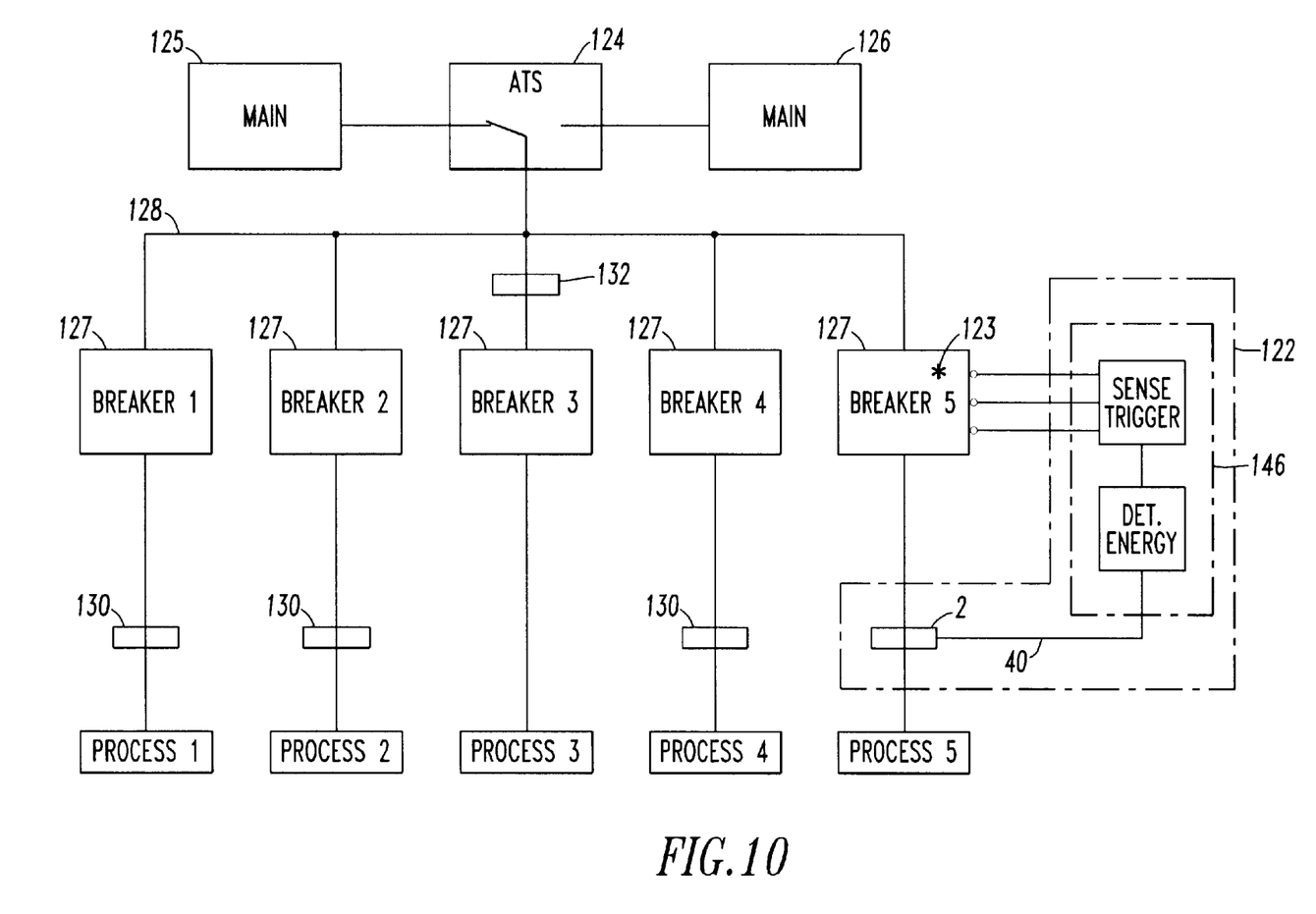
FIG. 10 is a block diagram of a shorting system in accordance with another embodiment of the invention.

FIG. 10 shows the shorting system 122, in which the shorting switch 2 is electrically connected downstream of one of the circuit breakers 127 (e.g., Breaker 5). In this application, individual shorting switches, such as 130 and 132 (which are otherwise the same as the shorting switches 2 or 2'), are employed downstream (e.g., with Breakers 1, 2 and 4) or upstream (e.g., with Breaker 3) each of the other circuit breakers 127.

The shorting switches 2,2' of FIGS. 1 and 2 are operable with a detection and activation circuit, which is similar to the circuit 146 of FIGS. 9 and 10. That circuit 146 includes the detection circuit 148 of FIG. 11, which detects the arcing fault 123 and responsively outputs one or more trigger signals 150, and the activation circuit 152 of FIGS. 12A–12B, which detects the one or more trigger signals 150 and responsively outputs the activation signal 40. The detection circuit 148 utilizes photovoltaic cells in a sensor unit, such as one of the sensor units 103,103',103" of FIGS. 8A–8C.

Figure 11:
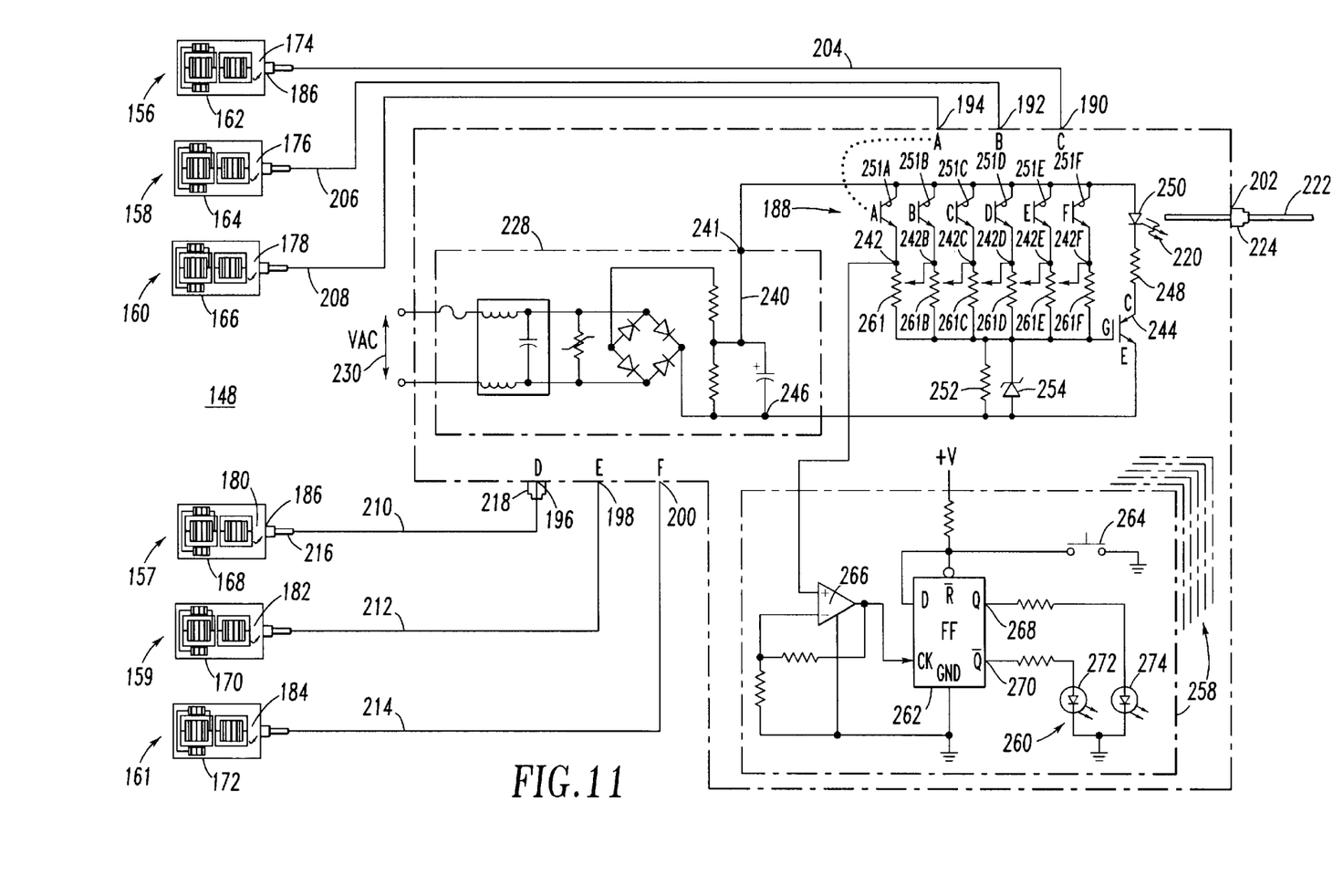
FIG. 11 is a block diagram in schematic form of the arcing fault detection circuit of FIG. 2.

FIG. 11 shows the detection circuit 148. In the exemplary embodiment, the power distribution equipment of FIG. 9 or 10 includes two circuit breaker cells 156,157, two upper cable cells 158,159, and two lower cable cells 160,161, although the invention is applicable to a wide range of low or medium voltage power distribution equipment having any count (e.g., one or more) of cells in which an arcing fault may occur. As another example, U.S. Pat. No. 6,229,680, which is incorporated by reference herein, discloses a switchgear cabinet having a forward compartment, a middle compartment and a rear compartment. The forward compartment is divided vertically into three cells in which are housed electrical switching apparatus such as circuit breakers.

The detection circuit 148 includes six photovoltaic sensors 162,164, 166,168,170,172 adapted to detect arcing faults in the cells 156,158,160,157,159,161, and output optical trigger signals 174,176,178,180,182,184, respectively. These photovoltaic sensors 162,164,166,168,170,172 are self-powered from arc light and have an output 186 (as shown with sensor 162) with the respective optical trigger signals 174,176,178,180,182,184, which are responsive to the arc light. In the exemplary embodiment, the photovoltaic sensors are shown in FIGS. 8A–8C, although any suitable sensor for detecting any characteristic of an arcing fault may be employed. In the exemplary embodiment, the detection circuit 148 is employed for each switchgear enclosure (not shown), with three photovoltaic sensors for each circuit breaker cell.

The detection circuit 148 further includes a suitable optical multiplexer 188 having a plurality of fiber optic inputs 190,192,194,196,198,200 and a fiber optic output 202. A plurality of suitable fiber optic cables 204,206,208, 210,212,214 are connected between the outputs 186 of the photovoltaic sensors 162,164,166,168,170,172 and the inputs 190,192,194,196,198,200, respectively, of the optical multiplexer 188. The fiber optic cables (as shown with cable 210) include a first connector 216 attached to the corresponding photovoltaic sensor output (as shown with the output 186 of sensor 168) and a second connector 218 attached to the corresponding optical multiplexer input (as shown with input 196).

Figure 12A:
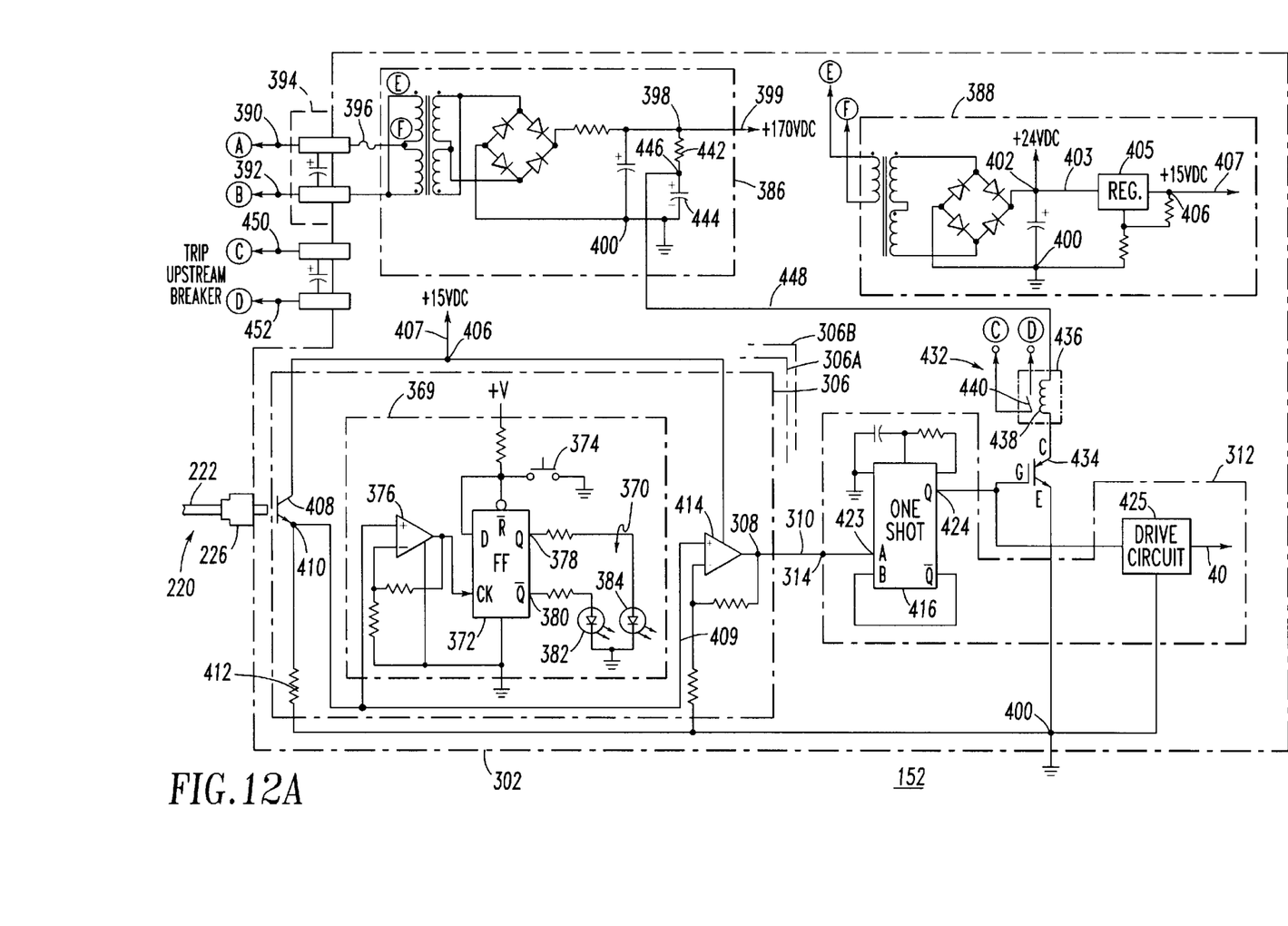
FIGS. 12A–12B are block diagrams in schematic form of the activation circuit of FIG. 2.

The output 202 of the optical multiplexer 188 outputs an optical trigger signal 220 to another fiber optic cable 222, which includes a first connector 224 attached to the multiplexer output 202. The other end (as shown in FIG. 12A) of fiber optic cable 222 includes a second connector 226, which is attached to the activation circuit 152. The optical multiplexer 188 functions to repeat any of the first optical trigger signals 174,176,178,180,182,184 to the second optical trigger signal 220. In operation, the photovoltaic sensors 162, 164,166,168,170,172 and the optical multiplexer 188 have a detection time of about 550 µs is after initiation of an arcing fault event to the activation of the second optical trigger signal 220, although the invention is applicable to a wide range of response times. The detection time varies (e.g., about 300 µs is to about 2 ms) as a function of the arc current magnitude and line of sight orientation of the sensor to the arc. The solenoid 38 of FIG. 2 requires a finite amount of time to move the plunger 36, which results in the release of the member 26 of FIG. 2. The solenoid current, which determines the movement of the plunger 36, is determined by the solenoid inductor resistance and the circuit inductance and resistance.

The detection circuit 148 further includes a suitable power supply, which in the exemplary embodiment is an AC/DC power supply 228, which inputs an AC line voltage 230 and outputs a suitable DC voltage 240 to the optical multiplexer 188 at node 241. For example, for input 194 (A), the optical multiplexer 188 has an electrical output 242, which is electrically connected to the gate of transistor 244 through resistor 261. The other five multiplexer inputs 192,190,196, 198,200 have similar outputs 242B,242C,242D,242E,242F, respectively. The emitter of the transistor 244 is electrically connected to the common 246 of the power supply 228, and the collector of the transistor 244 is electrically connected through a resistor 248 to the cathode of an output photodiode 250 of the optical multiplexer 188. The anode of the photodiode 250 and the collectors of the input phototransistors 251A–251F (e.g., similar to the phototransistor 408 of FIG. 12A) of the optical multiplexer 188 are electrically connected to the DC voltage node 241. A gate resistor 252 is electrically connected between the gate and emitter of the transistor 244. A zener diode 254 is electrically connected in parallel with the resistor 252.

The detection circuit 148 preferably includes a plurality of suitable indication circuits, such as 258 for multiplexer input A, having an input 259 and one or more indication outputs 260 for indicating the occurrence of an arc fault trigger event as determined by a suitable voltage at the optical multiplexer output 242 as measured across resistors 261 and 252. Other circuits 258 are provided for the other multiplexer inputs, which have resistors 261B, 261C, 261D, 261E, 261F electrically connected between the respective outputs 242B, 242C, 242D, 242E, 242F and the gate of transistor 244. Normally, the flip-flop (FF) 262 has a reset state, which is established by pushbutton 264. Otherwise, in response to an arc trigger event, the positive voltage across the resistors 261 and 252, as buffered by operational amplifier 266, causes the flip-flop outputs 268,270 to change state. In response, a green LED 272 is extinguished, and a red LED 274 is illuminated. Following manual operation of the pushbutton 264, the flip-flop outputs 268,270 change state, again, with the red LED 274 being extinguished and the green LED 272 being illuminated.

Figure 12B:
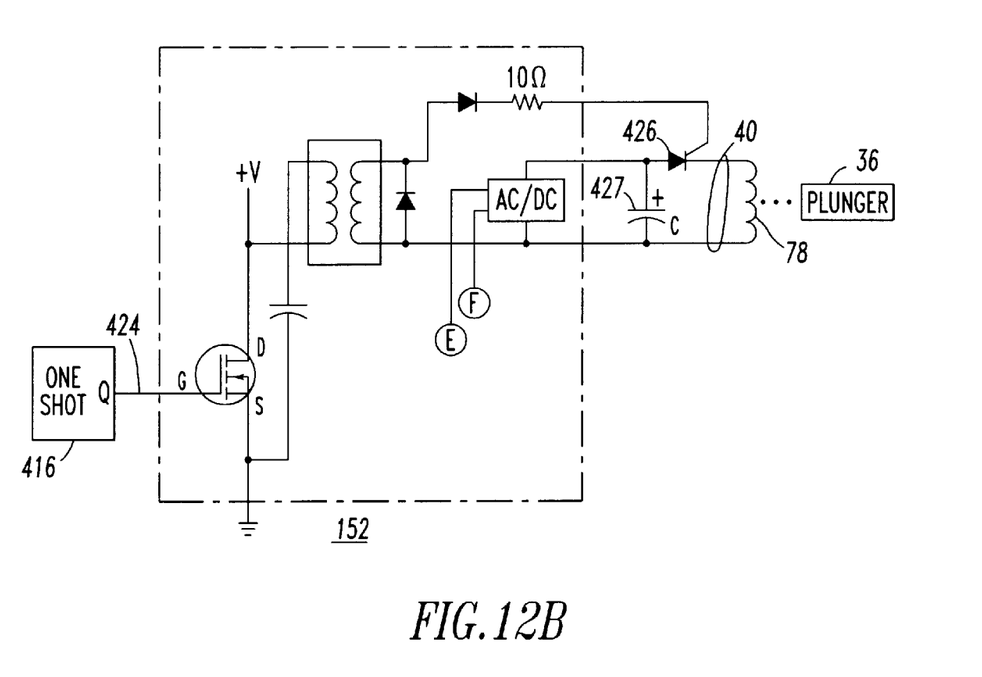

FIGS. 12A–12B show the activation circuit 152 of FIG. 9, which detects one or more of the trigger signals, such as the optical trigger signal 220 of FIG. 11, and responsively outputs the activation signal 40 to the solenoid coil 78 of FIG. 7.

The circuit 302, which is preferably housed in a suitable EMI/magnetic shield (not shown), includes one or more circuits 306,306A,306B for detecting the one or more trigger signals 220 (only one trigger signal is shown), respectively. For example, zero, one or more (e.g., 306A,306B) additional circuits may be employed in the event that the power distribution equipment includes more than six exemplary arc fault detection locations. The circuits 306,306A,306B include a common output 308 having a detected trigger signal 310.

A circuit 312 has an input 314, which is electrically connected to the common output 308 of the circuits 306, 306A,306B. The circuit 312 includes a circuit 425, which drives the actuation signal 40.

The circuit 306 preferably includes a suitable indication circuit 369, which is similar to the indication circuit 258 of FIG. 8. The circuit 369 has one or more indication outputs 370 for indicating that the trigger signal 220 has been received as determined by a suitable voltage at the node 410. Normally, the flip-flop 372 has a reset state, which is established by pushbutton 374. Otherwise, in response to the trigger signal 220, the voltage 409, as buffered by operational amplifier 376, causes the flip-flop outputs 378,380 to change state. In response, a green LED 382 is extinguished, and a red LED 384 is illuminated. Following manual operation of the pushbutton 374, the flip-flop outputs 378,380 change state, again, with the red LED 384 being extinguished and the green LED 382 being illuminated.

The circuit 302 includes a pair of power supplies 386,388, both of which are powered from input power nodes 390 and 392. The circuit 302 also includes a filter bushing 394, which further filters the line voltage between the nodes 390,392, and a fuse 396. The first power supply 386 has an output 398 with a suitable unregulated DC voltage 399 (e.g., +170 VDC) with respect to the ground node 400. The voltage 399 powers a portion of the circuit 312. The second power supply 388 has an output 402 with a suitable unregulated DC voltage 403 (e.g., +24 VDC) with respect to the ground node 400. The voltage 403 powers a DC/DC regulator 405, which has an output 406 with a suitable regulated DC voltage 407 (e.g., +15 VDC) with respect to the ground node 400. The voltage 407 powers the circuits 306,306A,306B.

As discussed above, the circuits 306,306A,306B detect the one or more optical trigger signals 220 (as shown with circuit 306) and have a common output 308 with the detected trigger signal 310. The circuit 306 includes a suitable phototransistor 408, which in the exemplary embodiment is a model OP802WSL marketed by Honeywell of Morristown, N.J., although any suitable phototransistor for optical signals may be employed. Whenever the optical trigger signal 220 is active, the phototransistor 408 generates a corresponding voltage 409 at output 410 by sourcing current through resistor 412 to the ground node 400. The voltage 409 is buffered by the non-inverting (+) input of operational amplifier 414, which provides the corresponding detected trigger signal 310 at the common output 308. The phototransistor 408 and the operational amplifier 414 are both powered from the power supply output 406 having the regulated DC voltage 407. The circuits 306A and 306B are similar to the circuit 306.

The circuit 312, which outputs the activation signal 40 responsive to the detected trigger signal 310, includes a one-shot multivibrator 416, which, in response to the rising edge of the detected trigger signal 310, as detected at input 423, provides a suitable pulse at output 424. FIG. 12B shows the circuit 425 for driving the solenoid coil 78 of FIG. 7 from the output 424 of the one-shot multivibrator 416. After the circuit 148 of FIG. 9 detects the arcing fault 123 and responsively outputs the trigger signal 150, the multivibrator output 424 provides a pulse of suitable duration (e.g., about 1.2 µs). In turn, the circuit 425 triggers a thyristor 426, which causes a capacitor (C) 427 to dump current into the solenoid coil 78.

Table 1 shows circuit values, which suitably move the solenoid plunger 36 in less than about 1 ms. These assume that the plunger mass, m, is 0.016 kg; that the length of the core, $l_{CORE}$, is 1.3 cm; and that the diameter of the core, $d_{CORE}$, is 2.64 cm. Although exemplary values are shown, a wide range of values and/or other suitable electro-mechanical mechanisms may be employed.

TABLE 1

| SYMBOL | VALUE | UNITS | DESCRIPTION |
|---|---|---|---|
| $V_o$ | 300 | V | Initial voltage of capacitor 427 |
| C | 3300 | μF | Capacitance of capacitor 427 |
| R | 31 | mΩ | Resistance of coil 78 |
| Lc | 3.9 | μH | Inductance of coil 78 |
| Lstray | 2 | μH | Stray circuit inductance |
| Δt | 0.000006 | s | Time increment for circuit analysis |
| τ | 0.0002 | s | Time constant (L/R) |
| ω | 6645.06 | Rad/s | Frequency |
| Cl | 7590.37 | A | Coefficient = $V_o/\omega L$ |
| N | 20 | # | Turns of coil 78 |
| $D_{COIL}$ | 2 | cm | Diameter of coil 78 |
| $L_{COIL}$ | 4 | cm | Length of coil 78 |
| μr | 1 | # | Permeability of coil 78 |

The value of L in Table 1 is defined by Lc + Lstray.

Referring again to FIG. 12A, the circuit 302 preferably includes a circuit 432 for tripping an upstream circuit breaker (not shown) in response to the detected trigger signal 310 and the output pulse of the multivibrator output 424. The circuit 432 includes a transistor 434 and a relay 436 having a coil 438 and contacts 440. The power supply 386 includes the series combination of a resistor 442 and a capacitor 444, which combination is electrically connected between the nodes 398,400. The common node 446 of the resistor-capacitor combination sources a suitable voltage 448 (e.g., about +170 VDC) to one side of the relay coil 438. The other side of the relay coil 438 is switched by the transistor 434 to the ground node 400 in response to the output pulse of the multivibrator output 424. In response to the energization of the coil 438, the normally open (NO) contacts 440 are closed. The contacts 440, in turn, are electrically connected to terminals 450,452, which are adapted for electrical connection to the upstream circuit breaker by a suitable cable (not shown).

Preferably, the circuits 306,312,432 of the activation circuit 152 provide a suitable delay (e.g., without limitation, about 6 to 10 ms) between the activation of the optical trigger signal 220 and the closure of the NO contacts 440.

Preferably, the activation circuit 152 includes an output relay and contact (not shown) which is employed to enable an upstream circuit breaker (not shown). The activation circuit 152 preferably further includes an annunciator circuit (not shown) which annunciates when such upstream circuit breaker is not enabled. Preferably, such upstream circuit breaker is enabled whenever the various power supply voltages (e.g., +15 VDC, +170 VDC) of the activation circuit 152 are suitably energized.

Figure 13A:
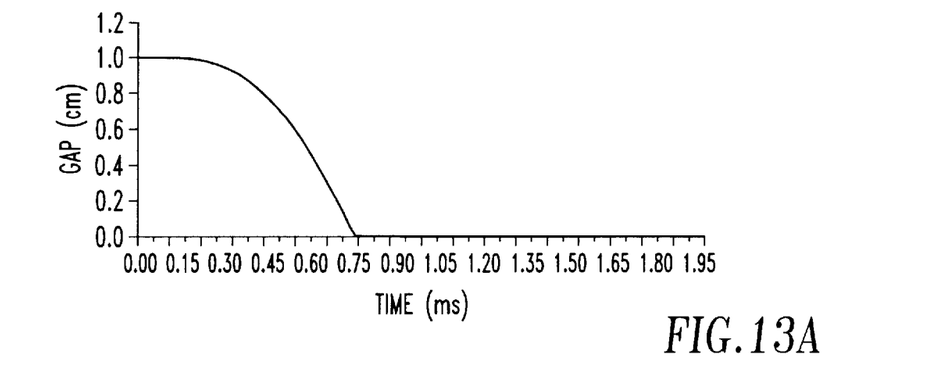
FIGS. 13A–13C are plots of gap, force and current, respectively, for analyzing the motion of the solenoid of FIG. 2.
Figure 13B:
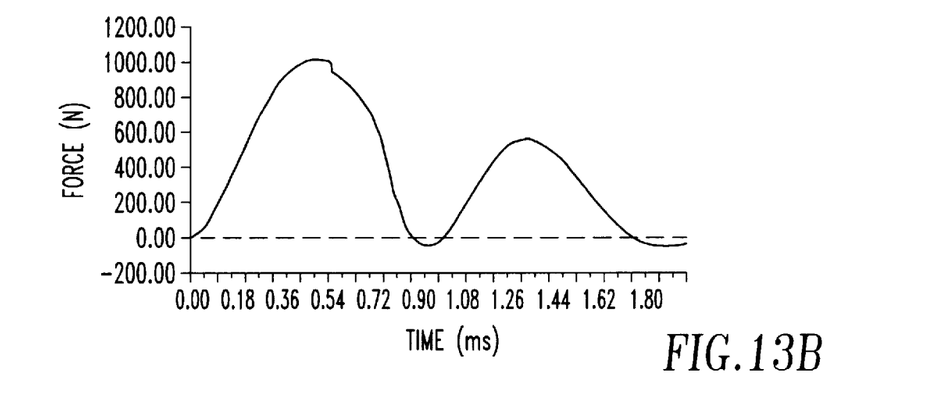
Figure 13C:
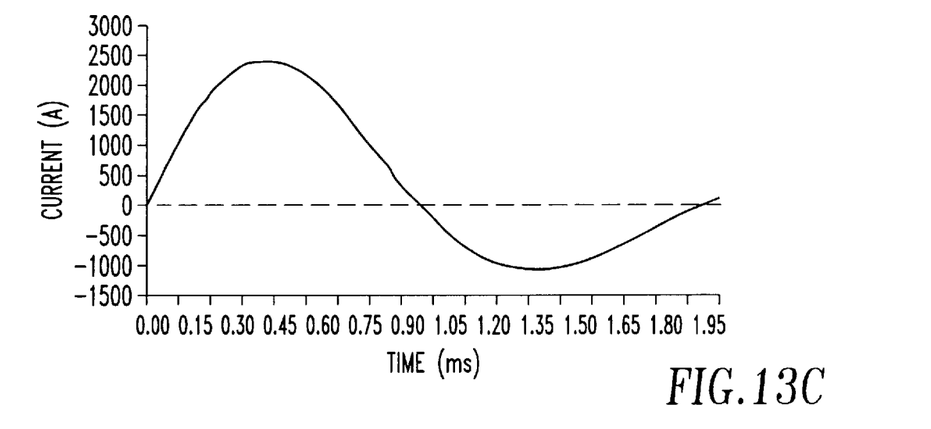

FIGS. 13A–13C show plots of the solenoid gap (g) of FIG. 7, force of the solenoid plunger 36, current of the solenoid coil 78 for analyzing the motion of the solenoid 38.

The exemplary shorting switches 2,2' disclosed herein employ relatively simple and low cost approaches for use with low and medium voltage power distribution equipment, such as switchgear. The shorting switch 2' may be enclosed in a suitably high vacuum environment in order to maintain, for example, a 120 kV BIL rating along with a 15 $kV_{RMS}$ system operating rating.

The shorting switches 2,2' do not employ any stored energy to close separable contacts. This is a very significant benefit since false triggering on an arcing fault event will not activate such shorting switches. The shorting switch closing force is proportional to the square of the current, which prevents the "separable contacts" formed by the conductor 10 and the switch member 16 from blowing apart and arcing.

A unique aspect of the shorting switches 2,2' is that such switches employ the fault current. The fault current does the work of closing the shorting switch. Hence, if there is no arcing fault, then there is no energy to close the switch member 16. This also serves as a confirmation signal. Rather than only sensing the presence of the arcing fault, the shorting switches 2,2' also employ the fault current to do the work of closing the switch member 16.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A shorting switch for eliminating arcing faults in power distribution equipment, said shorting switch comprising:
   a magnetic core having a pin member and an opening;
   a first terminal;
   a second terminal;
   a conductor electrically connected between said first and second terminals, said conductor passing through the opening of said magnetic core;
   a switch member pivotally mounted to the pin member of said magnetic core and adapted to pivot toward and engage said conductor in response to arcing fault current flowing through said conductor;
   a third terminal, which is electrically interconnected with said switch member;
   a latch member having a first position, which holds said switch member apart from said conductor, and a second position, which releases said switch member to permit said switch member to pivot toward said magnetic core and engage said conductor in response to said arcing fault current; and
   means for unlatching said latch member in response to an activation signal.

2. The shorting switch as recited in claim 1 wherein said latch member has a first end, which engages said switch member, a pivot point, and a second end; and wherein said means for unlatching said latch member in response to an activation signal comprises a solenoid having a plunger, which moves the second end of said latch member to pivot said latch member about said pivot point and cause the first end of said latch member to release said switch member.

3. The shorting switch as recited in claim 1 wherein said first and second terminals are adapted for electrical connection in series with a power line; and wherein said third terminal is adapted for electrical connection to a neutral or ground.

4. The shorting switch as recited in claim 1 wherein said first and second terminals are adapted for electrical connection in series with a first power line; and wherein said third terminal is adapted for electrical connection to a second different power line.

5. The shorting switch as recited in claim 1 wherein said pin member is electrically connected to said magnetic core, said switch member and said third terminal.

6. The shorting switch as recited in claim 1 wherein said magnetic core has a surface; and wherein said switch member is adapted to pivot toward the surface of said magnetic core.

7. The shorting switch as recited in claim 1 wherein said magnetic core includes a core portion having a base and a pair of legs; and wherein the pin member of said magnetic core is pinned between the legs thereof.

8. The shorting switch as recited in claim 7 wherein said magnetic core has a surface; and wherein said switch member is adapted to pivot toward the surface of said magnetic core.

9. The shorting switch as recited in claim 8 wherein said switch member has a surface, which is normally disposed at an arcuate angle with respect to the surface of said magnetic core.

10. The shorting switch as recited in claim 1 wherein said magnetic core is a steel core, which is electrically insulated from said conductor.

11. The shorting switch as recited in claim 1 wherein an air gap separates said conductor from said magnetic core at the opening thereof.

12. A shorting switch for eliminating arcing faults in power distribution equipment, said shorting switch comprising:

a magnetic core having a pin member and an opening;

a first terminal;

a second terminal;

a conductor electrically connected between said first and second terminals, said conductor passing through the opening of said magnetic core;

a switch member pivotally mounted to the pin member of said magnetic core and adapted to pivot toward and engage said conductor in response to arcing fault current flowing through said conductor;

a third terminal, which is electrically interconnected with said switch member;

a latch member having a first position, which holds said switch member apart from said conductor, and a second position, which releases said switch member to permit said switch member to pivot toward said magnetic core and engage said conductor in response to said arcing fault current;

a vacuum bottle, said conductor, said magnetic core, said pin member, and said switch member being disposed within said vacuum bottle; and means for unlatching said latch member in response to an activation signal.

13. The shorting switch as recited in claim 12 wherein said first, second and third terminals are disposed outside said vacuum bottle.

14. The shorting switch as recited in claim 12 wherein said switch member has a first end disposed within said vacuum bottle and a second end disposed outside said vacuum bottle.

15. The shorting switch as recited in claim 12 wherein said first and second terminals are adapted for operation with medium voltage power distribution equipment.

16. A shorting system for eliminating arcing faults in power distribution equipment, said shorting system comprising:

a magnetic core having a pin member and an opening;

a first terminal;

a second terminal;

a conductor electrically connected between said first and second terminals, said conductor passing through the opening of said magnetic core;

a switch member pivotally mounted to the pin member of said magnetic core and adapted to pivot toward and engage said conductor in response to arcing fault current flowing through said conductor;

a third terminal, which is electrically interconnected with said switch member;

a latch member having a first position, which holds said switch member apart from said conductor, and a second position, which releases said switch member to permit said switch member to pivot toward said magnetic core and engage said conductor in response to said arcing fault current;

means for unlatching said latch member in response to an activation signal; and means for detecting an arcing fault and responsively outputting said activation signal.

17. The shorting system as recited in claim 16 wherein said means for detecting an arcing fault outputs said activation signal within about 550 $\mu$s after initiation of an arcing fault event.

18. The shorting system as recited in claim 16 wherein said second terminal is adapted for electrical connection upstream of a plurality of circuit breakers.

19. The shorting system as recited in claim 16 wherein said first terminal is structured for electrical connection with a load terminal of a single circuit breaker.

20. The shorting system as recited in claim 16 wherein said means for detecting an arcing fault comprises means for detecting the arcing fault and responsively outputting a trigger signal, and means for detecting the trigger signal and responsively outputting said activation signal.

21. The shorting system as recited in claim 20 wherein said means for detecting the arcing fault and responsively outputting a trigger signal comprises a plurality of photovoltaic sensors adapted to detect the arcing fault and output a plurality of first optical signals on a plurality of outputs, an optical multiplexer having a plurality of inputs and an output, a plurality of fiber optic cables connected between the outputs of said photovoltaic sensors and the inputs of said optical multiplexer, the output of said optical multiplexer outputting a second optical signal as said trigger signal.

22. The shorting system as recited in claim 21 wherein said means for detecting an arcing fault and responsively outputting said activation signal comprises means for tripping an upstream circuit breaker for said power distribution equipment responsive to the detected trigger signal.

23. The shorting system as recited in claim 20 wherein said means for detecting the arcing fault and responsively outputting a trigger signal comprises at least one photovoltaic sensor adapted to detect the arcing fault and output an optical signal as said trigger signal.

24. The shorting system as recited in claim 23 wherein said arcing fault includes arc light; and wherein said at least one photovoltaic sensor is a photovoltaic sensor, which is self-powered from the arc light, said photovoltaic sensor having an output with said trigger signal, which is responsive to said arc light.

* * * * *